2,369,007

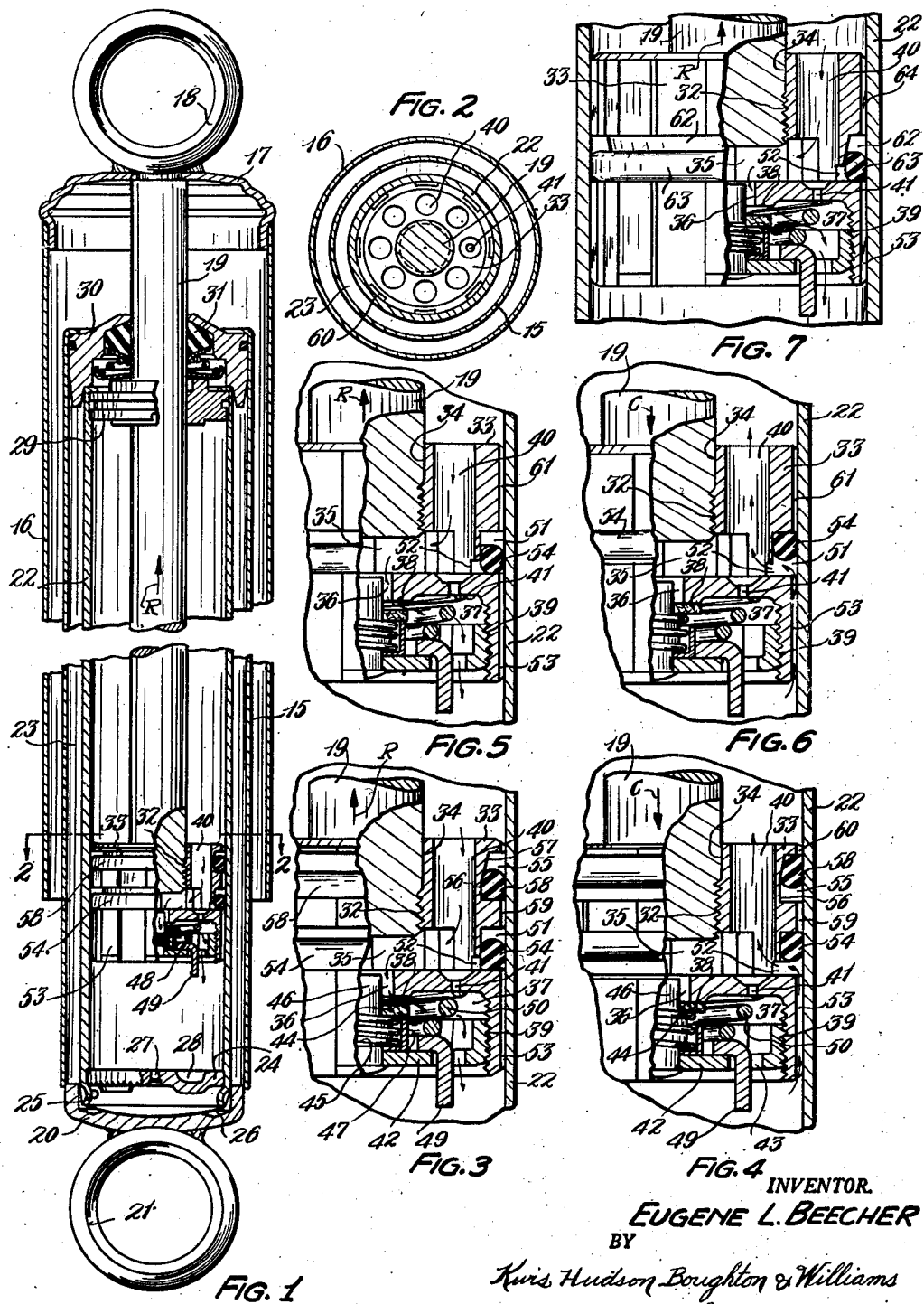
Feb. 6, 1945.  E. L. BEECHER  2,369,007
SHOCK ABSORBER
Filed June 10, 1943
INVENTOR.
EUGENE L. BEECHER Patented Feb. 6, 1945

UNITED STATES PATENT OFFICE 2,369,007

SHOCK ABSORBER

Eugene L. Beecher, Cleveland Heights, Ohio, assignor to The Gabriel Company, Cleveland, Ohio, a corporation of Ohio Application June 10, 1943, Serial No. 490,290

16 Claims. (Cl. 188—88)

This invention relates to a shock absorber and particularly to a fluid shock absorber.

Although the invention is applicable to various types of fluid shock absorbers, it is illustrated and explained herein by way of example as embodied in a direct double acting hydraulic shock absorber.

The invention in certain of its more specific aspects constitutes an improvement on my Patent No. 2,263,284, issued November 18, 1941, although other and broader aspects of the invention are not dependent on the construction shown and described in said patent.

An object of the invention is to provide a fluid shock absorber which may be advantageously employed on a vehicle and which is so constructed that in operation it will have improved shock absorbing characteristics and will impart to vehicles equipped with the same smooth and desirable riding qualities.

Another object of the invention is to provide a fluid shock absorber which is so constructed as to have in use the desirable characteristics of both the open orifice type and the closed orifice type of shock absorber and in addition to have sought-for characteristics not obtainable in either of the above mentioned types of shock absorbers and which characteristics are present during at least the impact stroke of the piston of the shock absorber.

A further object is to provide a fluid shock absorber which is so constructed as to have built into the device itself a frictional resistance or drag comparable to the frictional resistance or drag present between the leaves of leaf spring systems for vehicles and especially during the impact or compression stroke of the shock absorber.

A further object is to provide a fluid shock absorber wherein the piston embodies means which is self-energizing during the movement of the piston in one direction to create, in addition to the fluid resistance, a frictional resistance to the movement of the piston.

A still further object is to provide in a fluid shock absorber a piston which includes means that acts as a by-passing valve and further acts during the movement of the piston in one direction as a self-energizing frictional resistance means to the movement of the piston.

Another object is to provide a compound fluid shock absorber in that during the stroke of the piston in one direction a frictional resistance to the movement of the piston as well as a fluid resistance is created, while during its movement in the opposite direction the frictional resistance becomes inoperative.

A further object is to provide in a fluid shock absorber, a piston construction whereby the shock absorber can be readily changed from one having only fluid resistance to the movements of the piston to one wherein the movement of the piston in one direction is against both frictional and fluid resistance or vice versa.

A further object is to provide a shock absorber as specified in the last named object and which is extremely simple in design and requires only a minimum number of parts in its assembly.

Another object is to provide a fluid shock absorber wherein the piston includes self-energizing means for creating a frictonal resistance to the movement of the piston but which means is inoperative during the rotation of the piston for purposes of valve adjustment.

A still further object is to provide in a fluid shock absorber a piston construction which includes a valve seat for a spring tensioned valve and wherein said spring tension can be adjusted and which seat is so formed on the piston as to insure concentricity and alignment thereof with the threads that receive the adjusting member for the spring tension.

A still further object of the invention is to provide in a fluid shock absorber a piston rod and piston construction which is such that the concentricity and alignment between the piston rod and piston is readily obtained and excessive machining of the piston rod is avoided.

Another and more specific object is to provide in a fluid shock absorber a piston rod and piston construction which is such that the piston rod can be extremely simple in design, can have a constant diameter throughout, does not have any holes or passages formed therein and does not have to have any machined diameters or shoulders that must be held concentric with the piston.

Further and additional objects and advantages not hereinbefore specified will become apparent hereinafter during the detailed description of several embodiments of the invention which are illustrated in the accompanying drawing, wherein Fig. 1 is a longitudinal sectional view through a direct acting hydraulic shock absorber, the piston and piston rod being shown partly in elevation and partly in section, with the parts having the relationship they assume when the piston is moving during the recoil stroke of the shock absorber.

Fig. 2 is a transverse horizontal section taken on line 2—2 of Fig. 1 looking in the direction of the arrows.

Figs. 3 and 4 are fragmentary views of the piston and piston rod shown in Fig. 1 but on a larger scale and are partly in section and partly in elevation; Fig. 3 showing the relation of the parts during the recoil stroke of the shock absorber while Fig. 4 shows the relation of the parts during the impact or compression stroke thereof.

Figs. 5 and 6 are views similar to Figs. 3 and 4 but illustrate a modified form of piston construction than that shown in said Figs. 3 and 4, it being noted that in Figs. 5 and 6 the piston is not provided with a self-energizing frictional resistance means, and Fig. 7 is a view similar to either Fig. 3 or Fig. 5 but illustrating a different form of construction and one wherein the self-energizing frictional resistance means also functions as a by-passing valve.

A shock absorber embodying the present invention and illustrated in Figs. 1 to 4 inclusive of the accompanying drawing is by way of example a direct double acting hydraulic shock absorber. This shock absorber comprises a substantially cylindrical casing 15 which has relative telescoping movement within a cylindrical housing 16 that is spaced radially outwardly from the casing 15. The upper end of the housing 16 is closed by an inverted cup-shaped closure or cap member 17 provided on its outer side with an eye 18 with which the piston rod 19 is integral or is operatively connected thereto. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected with the eyes 18 and 21 by suitable means well known in the art, wherefore relative movement between the frame and axle of the vehicle will cause relative telescoping movement between the casing 15 and the housing 16 and relative movement of the piston in the pressure or working cylinder as will be well understood.

The pressure or working cylinder 22 of the shock absorber is disposed within the casing 15 in spaced concentric relationship therewith so that the space defined by the casing 15, cylinder 22, closure member 20 and a closure member for the upper end of the casing and the cylinder (later to be referred to) constitutes a reservoir 23 for the oil or liquid in the shock absorber.

The lower end of the cylinder 22 extends into the cup-shaped closure member 20 and is secured thereto by suitable means understood in the art. The cylinder 22 slightly upwardly of the lower end has secured therein a closure plate 24. The cylinder 22 below the closure plate 24 is provided with an inwardly extending bead 25 which serves to retain the closure plate 24 in position while the cup-shaped closure member 20 is provided with a plurality of circumferentially spaced internal grooves or channels 26 which place the reservoir 23 in communication with the space between the closure plate 24 and the bottom of the cup-shaped closure member 20.

The closure plate 24 is provided with a fixed centrally disposed orifice 27 and also has circularly spaced inwardly facing depressions 28 intermediate its circumference and the orifice 27 for a purpose later to be referred to, it being noted that in the present illustration there are two of these depressions shown.

The upper or high pressure end of the cylinder 22 is closed by a plug member 29 which fits into the cylinder and is suitably secured in position therein, it being noted that the upper edge of the cylinder is turned inwardly over the outer side of the plug member. The plug member is provided with a central opening through which slidably extends the piston rod 19. The construction of the plug member 29 forms no part of the present invention and is fully illustrated and described in my said Patent No. 2,263,284 and therefore further description of the same herein is unnecessary except to say that it tightly seals the upper end of the cylinder 22.

The upper end of the casing 15 is closed by a closure member 30 mounted in the casing and suitably connected thereto. The closure member 30 forms no part of the present invention and also is fully illustrated and described in my said Patent 2,263,284 and consequently need not be further referred to herein except to say that it tightly seals the upper end of the reservoir 23. The closure member 30 carries a suitable spring pressed packing 31 through which slidably extends the piston rod 19.

In my said Patent 2,263,284 the piston rod adjacent its lower end is shown and described as provided with a diametrically extending passage which communicates with a longitudinally extending passage. Also the piston rod of said patent is shown as having its inner end reduced in diameter to provide a shoulder while the extreme inner end of the portion of the rod of reduced diameter constitutes a valve seat for a spring pressed valve.

In the present construction it will be noted that the piston rod 19 is not provided with any passages therein and that said rod is of constant diameter throughout. Consequently the machining operations required in the production of the piston rod 19 are reduced to a minimum. It will also be noted that the inner end of the piston rod 19 does not act as a valve seat and that said inner end of the rod is merely provided with screw threads 32 by which the rod can be screwed into a central opening formed in the piston indicated as a whole at 33. In other words, in constructing the piston rod 19 it is not necessary to machine any passages, reduced portions or shoulders or to hold any such machined surfaces concentric to the normal diameter of the piston rod.

The piston 33 may be formed as shown in the drawing from a single piece of stock. The external configuration of the piston is of general cylindrical shape and said piston on its inner or upper side as viewed in the drawing is provided with a centrally located axially extending bore 34, the inner portion of which is threaded to receive the threads 32 of the piston rod 19 when said rod is assembled in the bore 34. The bore 34 at its threaded end communicates with a bore 35 concentric thereto but of larger diameter so as to be undercut with respect to the bore 34. The bore 35 communicates with a reduced bore 36 which is concentric to both the bores 34 and 35 and in turn communicates with an enlarged counterbore or recess 37 formed in the lower end of the piston as viewed in the drawing and concentric with the bores previously described.

The piston 33 in the bottom wall of the recess or counterbore 37 and concentric with the bore 36 is provided with an annular flat surface 38 which acts as a valve seat for a valve later to be described and which valve seat being formed on the piston itself and within the recess or counterbore 37 can readily be maintained concentric to the threads 39 formed in the wall of the recess or counterbore 37.

The piston 33 is provided with a plurality of axially extending passages 40 arranged in circularly spaced relationship between the periphery of the piston and the piston rod 19. These passages are illustrated in the present instance as eight in number and extend from the upper end of the piston to and communicate with the undercut bore 35 of the piston. The piston is also provided with a fixed orifice 41 of predetermined but small diameter and which orifice is in alignment with one of the passages 40 and places said one passage 40 and the bore 35 in communication with the enlarged counterbore or recess 37. The purpose of the fixed orifice 41 will be more fully explained hereinafter.

An exteriorly threaded plug 42 is screwed into the threads 39 of the recess or counterbore 37 and this plug is provided with a plurality of openings 43. A valve disk 44 controls the bore 36 and normally is held against the valve seat 38 by a coil spring 45 disposed between said valve disk and the plug 42. An axially extending guide pin 46, which is riveted or otherwise connected with the plug 42 extends through the valve disk 44 and retains the latter in proper position with respect to the valve seat and the lower end of the bore 36. A retaining cup 47 for the lower end of the spring 45 may be connected with the plug 42 by the rivet portion of the guide pin 46.

The tension of the spring 45 can be adjusted or varied by screwing the plug 42 into or out of the recess 37 as fully explained in the copending application Serial No. 427,783 of Donald L. Christofel now Patent No. 2,351,662, issued June 20, 1944. To enable this adjustment of the spring to be done when the shock absorber is fully assembled, the piston is provided with an adjusting member 48 having arm portions 49 which project through the slots 43 and cooperate when the shock absorber is in its collapsed condition with the recesses 28 formed in the plug 24 of the cylinder. The body portion of the adjusting member 48 is disposed in the recess or counterbore 37 and is provided with an opening therein which permits the cup 47 surrounding the valve spring 45 to seat against the plug 46. A second spring 50 located in the recess or counterbore 37 of the piston normally holds the adjusting member 48 against the plug 42 so that the arms 49 will project from the lower end of the piston for engagement in the recesses 28. However, should the arms 49 not align with the recesses 28 when the piston is collapsed then the adjusting member 48 and the arms 49 move inwardly of the recess 37 against the action of the spring 50.

In the piston shown in Figs. 1 to 4 inclusive there is provided in the periphery of the piston and intermediate its ends an annular groove or recess 51 which is rectangular in cross section and communicates at its lower side by means of openings 52 with the passages 40 and the bore 35. The periphery of the piston 33 below the annular groove 51 is provided with a plurality of axially extending circularly spaced shallow grooves 53 which place the groove 51 in communication with the lower end of the cylinder 22 below the piston 33.

A piston sealing packing in the form of a continuous ring 54 is mounted in the recess or groove 51. This ring is normally of circular cross section and may be formed of suitable material, such as natural rubber, synthetic rubber, or other composition which will serve the purpose. When the ring is mounted in the groove 51 and the piston is assembled in the cylinder 22 the cross section of the ring becomes oval, due to the engagement of the ring with the inner wall of the cylinder and the bottom wall of the annular recess or groove 51.

The piston 33 above the annular groove or recess 51 is provided with an annular groove or recess 55 but said groove or recess is not of constant depth. The lower portion of the groove or recess 55 is of constant depth and has its inner or bottom wall 56 parallel to the inner wall surface of the cylinder 22. The upper portion of the recess or groove 55 is of varying depth and has its inner or bottom wall 57 upwardly inclined toward the inner wall surface of the cylinder 22. A ring 58, similar to the ring 54, is mounted in the groove or recess 55 and said ring when in the lower portion of the groove, see Fig. 3, is not substantially compressed or distorted, but when the ring 58 is in the upper portion of the groove, see Fig. 4, said ring is compressed or distorted and tightly engages the inner surface of the cylinder 22 and creates a frictional resistance to the movement of the piston 33 in the cylinder.

The periphery of the cylinder 33 is provided with circularly spaced axially extending grooves 59 placing the annular grooves 51 and 55 in communication and said piston also has peripheral axially extending circularly spaced grooves 60 which place the annular groove 55 in communication with the pressure chamber above the piston 33. The purpose of the peripheral axially extending grooves 59 and 60 is to vent or bleed any oil which otherwise might be trapped in the annular grooves 51 and 55 during the operation of the shock absorber and as the rings 54 and 58 shift positions in their respective annular grooves 51 and 55.

The operation of the shock absorber shown in Figs. 1 to 4 inclusive will now be described, in order to fully bring out the advantages of the construction and to explain the function of the parts, particularly the grooves 51 and 55 and the rings 54 and 58. When the vehicle to which the shock absorber is attached strikes an obstruction in the road and the vehicle springs are compressed because of this impact the piston relatively moves downwardly in the cylinder 22 as indicated by the arrow C in Fig. 4. This stroke of the piston is known as the impact or compression stroke. It will be seen that when the piston 33 is traveling in its impact or compression stroke the valve disk 44 is seated on the valve seat 38 and no oil may flow through the bore 36. A predetermined constant volume of oil may flow through the fixed orifice 41 from the recess 37 and into the bore 35 and thence through the passages 40. When the piston 33 moves downwardly in the cylinder during the impact or compression stroke the ring 54 in the groove 51 will assume the position shown in Fig. 4, and consequently the oil below the piston is free to flow through the peripheral axial grooves 53 into the annular groove 51, thence through the openings 52 and into the passages 40, as indicated by the arrows in Fig. 4. It will be observed consequently that a relatively free flow of oil from the lower side of the piston to the upper side of the piston is provided for during the impact or compression stroke thereof and that hence the hydraulic resistance to the movement of the piston is largely created by the necessity of the oil displaced by the piston rod 19 passing through the fixed orifice 27 in the closure plate 24 and into the reservoir 23. This hydraulic resistance to the impact movement of the piston may, in some instances, be all of the resistance that is required during the impact or compression stroke of the shock absorber. However, there will be other instances wherein it will be desirable to superimpose upon such hydraulic resistance frictional resistance to the movement of the piston during the impact or compression stroke thereof. The imposition of this frictional resistance is provided for by the arrangement of the ring 58 in the annular groove 55.

By reference to Fig. 4 it will be seen that during the impact or compression stroke of the piston the ring 58 has moved out of the lower portion of the groove 55 and into the upper portion thereof which is of varying and diminishing depth, with the result that the ring 58 is distorted in cross section due to the shallow depth of the upper portion of the groove 55 and exerts a substantial frictional drag upon the inner wall of the cylinder 22, thus creating a frictional resistance to the impact or downward movement of the piston in the shock absorber.

When the compressed vehicle springs start their recoil movement after the obstruction has been passed the shock absorber starts its recoil stroke with the piston 33 moving upwardly in the cylinder 22 as indicated by the arrow R in Figs. 1 and 3. This upward or recoil movement of the piston 33 causes the ring 58 to roll from the upper portion of the groove 55 and into the lower portion thereof which is of constant and deeper depth, that is the ring 58 rolls from the position shown in Fig. 4 wherein it is exerting frictional resistance to the downward movement of the piston, into the position shown in Fig. 3, wherein it exerts no appreciable frictional drag to the upward movement of the piston.

Similarly, the ring 54 upon the recoil or upward movement of the piston rolls from the position shown in Fig. 4 into the lower part of the groove 51 as shown in Fig. 3 and in which position said ring closes the openings 52, with the result that the passages 40 are now out of communication with the peripheral axially extending grooves 53. Consequently during the recoil stroke of the piston the oil above the piston can only pass to the lower side of the piston through the fixed orifice 41 and by means of the passages 40 through the bore 36 after the pressure above the piston has reached a predetermined point sufficient to unseat the valve disk 44 against the action of the spring 45, at which time the oil will be flowing through the piston as indicated by the arrows in Fig. 5.

The displacement of the rings 54 and 58 in the grooves 51 and 55 is due to the rolling action which the rings have in the grooves upon the reciprocating movement of the piston in the cylinder 22. This rolling action is brought about by the frictional engagement of the rings with the inner surface of the cylinder 22 and by the normally circular cross section of the rings, it being understood that the groove 51 and the lower portion of the groove 55 which is of constant depth are so dimensioned as to permit this rolling action. Consequently it will be seen that the ring 54 acts as a piston sealing packing and also renders itself active and inactive as a by-passing valve depending upon the direction of the piston stroke.

It will further be seen that the ring 58 is a self-energizing or deenergizing frictional resistance means depending upon the direction of movement of the piston in the cylinder. In addition it will be noted that the rings 54 and 58 do not interfere with the adjustment of the tension of the valve spring 45 when the shock absorber is collapsed since when the piston is rotated relative to the cylinder 22 said piston will turn within the rings which are frictionally engaging the inner surface of the cylinder.

It will also be understood that the ring 58 can readily be omitted from the piston if it is not desired to have a frictional resistance to the impact movement of the piston.

In the form shown in Figs. 5 and 6 the annular groove 55 is omitted as well as the ring 58, and consequently there is no frictional resistance to the impact or downward movement of the piston, see Fig. 6, in this embodiment of the invention. In this form of the invention the ring 54 functions identically with the ring 54 of the previously described form and the same reference characters have been used in Figs. 5 and 6 to indicate the parts which are identical with the parts previously described.

In the form shown in Figs. 5 and 6 the periphery of the piston above the annular groove 51 is provided with a plurality of circumferentially spaced axially extending grooves 61 which place the groove 51 in communication with the interior of the cylinder 22 above the piston 33 and act to vent or bleed any oil which might otherwise be trapped in the annular groove 51. The functioning of the parts of the piston shown in Figs. 5 and 6 during the operation of the shock absorber and the function of the groove 51 and the ring 54 are identical with the function of the corresponding parts in the previously described form of the invention.

A still different embodiment of the invention is illustrated in Fig. 7. However, insofar as the parts of Fig. 7 are identical with the corresponding parts in the form of the invention shown in Figs. 1 to 3 the same reference characters have been employed. In Fig. 7 a single annular groove or recess 63 takes the place of the annular grooves or recesses 51 and 55 on the periphery of the piston shown in Figs. 1 to 4 inclusive. The annular groove 62 in the form shown in Fig. 7 is in the same relative location on the piston as is the annular groove 51 of the previously described forms and is in communication with the lower end of the passages 40 and with the bore 35 by means of openings 52. However, the upper portion of the annular groove 62 is of upwardly diminishing depth corresponding to the upper portion of the annular groove 55 of the first described form of the invention. In Fig. 7 a piston sealing packing ring 63 is mounted in the annular groove 62 and this ring has the combined action of a by-passing valve and also a self-energizing frictional resistance means to the movement of the piston in one direction.

The annular groove 62 is in communication with the cylinder 22 above the piston by a plurality of circularly spaced axially extending grooves 64 formed in the periphery of the piston and serving to prevent the trapping of oil in the annular groove 62.

In Fig. 7 the parts are shown in the relationship they have to each other during the recoil stroke of the piston as indicated by the arrow R. During the recoil stroke of the piston the ring 63 has rolled to the lower portion of the annular groove 62 and acts as a valve to seal the openings 52. At this time the ring 63 is not exerting any substantial frictional resistance to the recoil or upward movement of the piston but is merely serving as stated to close the openings 52 and to act as a piston packing. It will be understood that during the impact or compression stroke of the piston when the latter is moving downwardly in the cylinder 22 the ring 63 rolls into the upper portion of the annular groove 62 and is deformed due to the shallow depth of said portion of the groove and exerts a substantial frictional resistance to said downward movement of the piston in a manner corresponding to the function of the ring 58 when in the position shown in Fig. 4. In other words, during the impact or downward movement of the piston the ring 63 frees the openings 52 and not only serves as a piston packing but also acts as a self-energizing frictional resistance means and superimposes upon the hydraulic resistance to the downward movement of the piston a frictional resistance thereto. Simply stated, the ring 63 and the groove 64 combines the functions of the rings 54 and 58 and the grooves 51 and 55 of the first described form of the invention.

From the foregoing description of various embodiments of the invention it will have been seen that the construction of the piston rod and piston is such as to insure concentricity between the threads 39 and the valve seat 38 which latter is formed on the piston and not on the end of the piston rod.

In the present invention the machining of the piston rod is reduced to a minimum since said rod does not have any holes or machined diameters and shoulders and, therefore, the concentricity and alignment between the piston rod and the piston can be effectively preserved. It will also have been noted that the construction of the piston and piston rod is such that they can be utilized in a shock absorber of either the compound type, i. e., a shock absorber having both frictional and hydraulic resistance, or in a shock absorber of the type having merely hydraulic resistance to the movement of the piston.

The shock absorber embodying the present invention may include frictional resistance in combination with the hydraulic resistance on the impact or compression stroke and which frictional resistance automatically becomes inoperative on the recoil stroke. In addition, the frictional resistance for the impact or compression stroke of the piston may be provided for or eliminated by the simple procedure of adding or removing one part, namely, the ring 58 in the form shown in Figs. 1 to 4 inclusive.

In the form shown in Fig. 7 the piston is provided with a piston packing that also acts as a by-passing valve and further acts as a self-energizing frictional resistance means to the movement of the piston in one direction and which frictional resistance is utilized in combination with hydraulic resistance.

Furthermore, the piston of the present invention comprises a minimum number of parts in accomplishing the varied and manifold different modes of operation. It will further have been noted that the piston packing rings do not interfere with the rotation of the piston in the cylinder 22 when the tension of the spring 45 is adjusted, since the piston merely turns within the rings while the latter are retained stationary by their engagement with the inner wall of the cylinder.

Although several preferred embodiments of the invention have been illustrated and described herein, it will be understood that the invention is susceptible of various modifications and adaptations within the scope of the appended claims.

Having thus described my invention, I claim:

1. In a fluid shock absorber, a cylinder, a piston reciprocable therein, and means controlling the flow of fluid through said piston and including a groove of rectangular cross section extending around the periphery thereof, circularly spaced grooves in the periphery of the piston extending axially thereof from one end of the piston to said first named groove, circularly spaced passages extending axially of said piston from the opposite end thereof, circularly spaced openings placing said passages in communication with said first named groove adjacent one side of the latter, and a packing ring normally of circular cross-section in said first named groove and contacting the interior of said cylinder and of less cross sectional width than the width of said groove, said packing ring having rolling shifting movement in said first named groove upon a change in direction of movement of said piston, whereby said ring automatically seals said openings during one piston stroke and automatically opens the same during the opposite piston stroke.

2. A fluid shock absorber as defined in claim 1 and wherein the means controlling the flow of fluid through said piston includes a fixed constantly open orifice functioning on both piston strokes for the passage of fluid therethrough and a spring pressed popoff valve means automatically opening during the stroke of the piston in one direction.

3. In a shock absorber, a cylinder, a piston reciprocable therein, and means for imparting frictional resistance to the movement of said piston in one direction and including a recess formed in the periphery of the piston and of diminishing depth axially of said piston, and a friction member mounted in said recess and shiftable therein axially of said piston and contacting the wall of said cylinder, said recess and member being so proportioned that when the latter is in the portion of the recess of greater depth it exerts no substantial frictional contact with the wall of said cylinder, but when it is in that portion of said recess of lesser depth it tightly engages the cylinder wall and exerts a substantial frictional resistance to the movement of the piston.

4. In a shock absorber, a cylinder, a piston reciprocable therein, and means for creating a frictional resistance to the movement of said piston in one direction and including a groove formed in the periphery of said piston and of diminishing depth in a direction axially of the piston, and a ring mounted in said groove and automatically shiftable therein from the portion of the groove of greater depth into the portion of lesser depth or vice versa depending upon the direction of movement of the piston, said ring contacting the wall of said cylinder and when in the groove portion of lesser depth being de formed and tightly engaging the cylinder to resist frictionally the movement of the piston but when in the portion of greater depth exerting no substantial resistance to the piston movement.

5. In a shock absorber, a cylinder, a piston reciprocable therein, and means for frictionally resisting the movement of said piston in one direction and including a groove extending around the periphery thereof and having a portion of constant depth and a portion of diminishing depth with the said portions arranged axially of said piston, and a friction ring mounted in said groove and contacting the interior of said cylinder and automatically shiftable in the groove axially of the piston when the latter's direction of movement is reversed, said ring when in the groove portion of constant depth exerting no substantial frictional resistance to the movement of the piston and when in the groove portion of varying depth being deformed and exerting substantial frictional resistance to the piston movement.

6. In a fluid shock absorber, a cylinder, a piston reciprocable therein, means controlling the flow of fluid through said piston and including a groove extending around the periphery thereof, passages extending axially from opposite ends of said piston and communicating with each other through said groove, and a packing ring in said groove and contacting the interior of said cylinder and shiftable in said groove axially of the piston when the latter's direction of movement is reversed whereby said ring automatically seals communication between said passages during one piston stroke and automatically establishes the same during the opposite piston stroke; and means for imposing a frictional resistance to the movement of said piston in one direction and including a groove extending around the periphery of the piston and having axially spaced portions one of which is of constant depth and the other of which is of diminishing depth, and a ring mounted in said last named groove and contacting the interior of the cylinder and automatically shiftable in said groove into either portion thereof depending upon the direction of movement of the piston, said last named ring when in the groove portion of diminishing depth engaging the cylinder wall with a substantial frictional engagement.

7. In a fluid shock absorber, a cylinder, a piston reciprocable therein, and means controlling the flow of fluid through said piston and for imposing a frictional resistance to the movement of said piston in one direction and including a groove extending around the periphery of the piston and which groove diminishes in depth in a direction axially of the piston, passages extending axially from opposing ends of said piston and communicating with each other through said groove at the portion of the latter of greater depth, and a packing ring in said groove and contacting the interior of said cylinder and shiftable in said groove axially of the piston when the latter's direction of movement is reversed whereby said ring automatically shifts into the groove portion of greatest depth during one piston stroke and seals communication between said passages and automatically shifts during the opposite piston stroke into the groove portion of lesser depth and establishes communication between said passages and exerts a tight frictional engagement with the wall of said cylinder.

8. In a fluid shock absorber, a cylinder, a piston reciprocable therein, and means controlling the flow of fluid from one side of said piston to the other side thereof and including a groove extending around the periphery of the piston, an internal passage in the piston extending axially thereof from one end of the piston, said piston being provided with an opening located in the bottom wall of said groove adjacent one side wall of the latter and placing said groove and said internal passage in communication, a peripheral passage in said piston extending axially thereof from the opposite end of the piston and communicating with said groove adjacent said one side wall thereof, and a packing ring in said groove and contacting the interior of said cylinder and of less width than the distance between the side walls of said groove, said ring being thus enabled to shift bodily in said groove axially of the piston when the latter's direction of movement is reversed whereby said ring during one piston stroke is located adjacent said one side wall of said groove and seals said opening and said peripheral passage while during the opposite piston stroke it shifts from said position to one wherein it is free of said opening and said peripheral passage.

9. In a fluid shock absorber, a cylinder, a piston reciprocable therein, and means controlling the flow of fluid from one side of said piston to the opposite side thereof as defined in claim 8 and wherein the piston is provided with a plurality of circularly spaced internal passages, a plurality of circularly spaced openings in the bottom wall of the groove adjacent one side wall of the latter and placing said internal passages in communication with said groove and with a plurality of the circularly spaced peripheral passages extending axially of the piston and communicating with said groove.

10. In a fluid shock absorber, a cylinder, a piston reciprocable therein, and means controlling the flow of fluid from one side of said piston to the other side thereof and including a groove extending around the periphery of the piston and having side walls spaced axially of the piston, passages extending from the opposite ends of said piston and terminating in said groove, and a packing ring in said groove and contacting the interior of said cylinder, said ring being of such size and shape relative to the size and shape of said groove that upon changes in the direction of piston movement the ring shifts automatically from adjacent one side wall of said groove to adjacent the other side wall thereof, the points where said passages terminate in said groove being so disposed that said ring closes said passages when the ring is adjacent one side wall of the groove and opens said passages when it is adjacent the other side wall thereof.

11. In a fluid shock absorber, a cylinder, a piston reciprocable therein and provided intermediate its ends with a groove extending around its periphery and having side walls spaced axially of the piston, passages extending from the opposite ends of said piston and terminating in said groove at a side wall thereof, and a packing ring in said groove and engaging said cylinder and of such size and shape relative to said groove that during piston movement in one direction said ring closes said passages and during piston movement in the opposite direction opens said passages.

12. In a fluid shock absorber, a cylinder, a piston reciprocable therein and provided intermediate its ends with a groove extending around its periphery, said groove being of less depth toward one end of said piston than toward the opposite end thereof, passages extending from the opposite ends of said piston and terminating in said groove at the portion thereof of greater depth, and a packing ring in said groove and engaging said cylinder and of such size and shape relative to said groove that during piston movement in one direction said ring moves into the groove portion of greater depth and closes said passages and during piston movement in the opposite direction moves into the groove portion of lesser depth and opens said passages and creates a frictional resistance to the piston movement in said opposite direction.

13. In a fluid shock absorber, a cylinder, a piston reciprocable therein, and means controlling the flow of fluid from one side of said piston to the other side thereof and for exerting a self-energizing frictional resistance to piston movement in one direction and including a groove extending around the periphery of the piston and having side walls spaced axially of the piston and of greater depth adjacent one side wall than adjacent the other side wall thereof, passages extending from the opposite ends of said piston and terminating in said groove at said one side wall thereof, and a packing ring in said groove and contacting the interior of said cylinder, said ring being of such size and shape relative to the size and shape of said groove that upon piston movement in one direction said ring moves toward said one side wall of said groove and closes said passages and upon piston movement in the opposite direction said ring moves toward said other side wall of said groove and opens said passages and exerts a frictional resistance to the piston movement.

14. In a fluid shock absorber, a cylinder, a piston reciprocable therein and provided intermediate its ends with a groove extending around its periphery and having side walls spaced axially of the piston, passages extending from the opposite ends of said piston and terminating in said groove at one side wall thereof, a packing ring in said groove and engaging said cylinder and of such size and shape relative to said groove that during piston movement in one direction said ring moves toward said one side wall and closes said passages and during piston movement in the opposite direction moves toward the other side wall and opens said passages, said piston being provided with a second groove extending around its periphery and spaced axially of the piston from said first named groove, said second named groove being of greater depth adjacent one side wall thereof than adjacent its opposite side wall, and a packing ring in said second named groove and movable during piston movement in said one direction into the portion of said second named groove of greater depth and during piston movement in the opposite direction into the portion of said second named groove of lesser depth to exert a frictional resistance to said piston movement in said opposite direction.

15. In a fluid shock absorber, a cylinder, a piston reciprocable therein and comprising a piston body having a centrally disposed concentric bore extending axially from one end of said body and a larger concentric bore at the inner end of said first bore, said body also having a concentric axially extending bore of smaller diameter than both of said previously mentioned bores and communicating with said larger bore, said body adjacent its other end being provided with a concentric recess of larger diameter than any of said bores and communicating with said third named bore and having its inner end wall provided with an annular boss forming a seat for a valve which seals communication between said third named bore and said recess.

16. In a fluid shock absorber as defined in claim 15, a piston rod movable in said cylinder and extending outwardly thereof and provided on its inner end with screw threads, and screw threads provided in the first mentioned bore of said piston body wherefore said rod can be screwed into said first mentioned bore and thus connected to said piston body.

EUGENE L. BEECHER.